United States Patent
Fuesser

[11] Patent Number: 6,148,782
[45] Date of Patent: Nov. 21, 2000

[54] AIRFLOW DEVICE

[75] Inventor: Rolf Fuesser, Bad Herrenalb, Germany

[73] Assignee: Filterwerk Mann & Hummel GmbH, Ludwigsburg, Germany

[21] Appl. No.: 09/194,763

[22] PCT Filed: May 9, 1997

[86] PCT No.: PCT/EP97/02384

§ 371 Date: Dec. 3, 1998

§ 102(e) Date: Dec. 3, 1998

[87] PCT Pub. No.: WO97/46797

PCT Pub. Date: Dec. 11, 1997

[30] Foreign Application Priority Data

Jun. 3, 1996 [DE] Germany ............................ 196 22 235
Aug. 1, 1996 [DE] Germany ............................ 196 31 036

[51] Int. Cl.[7] .................................................. F02M 35/10
[52] U.S. Cl. .................................. 123/184.53; 123/184.55
[58] Field of Search ........................ 123/184.53, 184.55, 123/184.56, 184.21, 184.57

[56] References Cited

U.S. PATENT DOCUMENTS

| | | | |
|---|---|---|---|
| 2,835,235 | 5/1958 | Gassmann | 123/184.55 |
| 4,932,369 | 6/1990 | Parr | 123/184.42 |
| 5,143,026 | 9/1992 | Brustle et al. | 123/184.55 |
| 5,438,964 | 8/1995 | Breidenbach | 123/184.55 |
| 5,947,072 | 9/1999 | Loy et al. | 123/184.56 |

*Primary Examiner*—Andrew M. Dolinar
*Assistant Examiner*—Hai Huynh
*Attorney, Agent, or Firm*—Evenson, McKeown, Edwards & Lenahan, P.L.L.C.

[57] ABSTRACT

An air flow device in which there are adjusters in the flow path to alter the flow geometry of the air. The total cross section of the flow path is divided into individual flow channels (15, 16, 17) or tube sections (1, 3, 4) one inside the other, and there are mechanisms or adjusters (13, 14) by which the flow paths in the individual flow channels (15, 16, 17; 1, 3, 4) can be controlled. In a preferred embodiment there are three flow channels (15, 16, 17) the ends of which are connected to an internal aperture (22 to 27) in the adjusters (13, 14).

20 Claims, 3 Drawing Sheets

AIRFLOW DEVICE

BACKGROUND OF THE INVENTION

The invention relates to an air flow device for a unit, for example an internal combustion engine, which requires for its operation a given amount of air, in accordance with the preamble of claim 1 and the parallel independent claim 6.

For example, in known internal combustion engines for motor vehicles, to achieve optimal performance air intake systems are preferred which have variable intake sections and thus permit adaptation to various requirements of engine operation. Noise suppression is also important here.

For example, an air intake device for an internal combustion engine is disclosed in DE-OS 40 41 786, in which a controllable shut-off means is present in order to vary the opening through which the aspirated air flows. The shut-off means is in a transverse channel situated between two intake channels and is opened or closed by commands from an electronic control. The commands are dependent upon the rotational speed of the internal combustion engine and on the temperature of the outside air, which is determined by a temperature sensor.

To achieve an improvement of efficiency in the conversion of energy by an internal combustion engine in a range far below the nominal engine power and thus a reduction of the fuel consumption per unit distance, a selective cutoff of cylinders in the internal combustion engine is often practiced. To control engine torque the number of active cylinders can be reduced, in addition to the ordinary throttle adjustment. The cylinders not contributing to the torque continue to run mechanically but are not supplied with fuel. In this cylinder cutout system, however, the pulsation of the aspirated air also changes.

One typical application of cylinder cutout involves changing a 6-cylinder internal combustion engine from 6-cylinder to 3-cylinder operation. Although the suction pulse emitted by each of these cylinders in the air intake device remains unchanged in itself, the cyclical interaction of 6 cylinders results in a different kind of pulsation than that of 3 cylinders. Especially, deep humming sounds are annoying; in view of the space available in a motor vehicle, these low-frequency components can be diminished only by costly reflective sound dampers (e.g., Helmholtz resonators).

But also in many other applications the resonating action of the air intake device plays an important part, and often the available space is a critical factor.

SUMMARY OF THE INVENTION

The invention is addressed to the problem of improving in a simple manner an air flow device according to the preamble of claim 1 and of the parallel independent claim 6, such that optimal operating conditions, and especially noise conditions, will prevail in different states of operation of the attached unit.

The air flow device according to the invention solves the stated problem by the features specified in the characterizing part of claim 1 and of the parallel independent claim 6. The air flow device of the invention is advantageous especially due to the fact that, by varying the course of the air flow and the aspiration geometry, an adaptation can be made to various states of operation, as for example when the number of cylinders in an internal combustion engine is varied, especially with regard to the optimization of noise emission.

The invention describes a flexible system for aspirating various amounts of air, especially in the case of pulsating flow conditions. With two adjusting devices according to claim 1, it is advantageously possible with one of them to switch the paths of the flow between them and with the other to change sound propagation paths through at least three flow channels consisting for example of flexible tubes. In the embodiment of the invention, a flap in each adjusting device can assume two positions in which, by deflecting the air flow, either a longer and narrower or a shorter and wider flow path and sound propagation path can be created.

An air flow device contains at the inlet end an air filter, as a rule, with an air intake funnel. These parts form a series-connected Helmholtz resonator whose resonance frequency results from the following formula:

$$f_{res} = 340/2\Pi \cdot \sqrt{\sqrt{A/l \cdot V}}$$

$f_{res}$=Frequency of resonance
A=Cross section of the resulting flow passage
l=Length of the resulting flow passage
V=Volume of the air filter that follows The result is thus a tripling of the resonance frequency by an enlargement of cross section by the parallel opening of the three flow passages and a one-third reduction of the resonance frequency by a lengthening achieved by connecting the three flow channels in tandem. In one application, for example, the lower value can be at 25 Hz and the upper value at 75 Hz. The noise suppression then begins at tones above the frequency of 35 Hz and 106 Hz, respectively.

According to one embodiment, the valve pivot shafts of the two adjusting devices can be coupled fixedly to one another, so that a simple arrangement results for obtaining the conditions described above. In this case the adjusting devices can be placed directly side by side or one over the other, and thus the two pivot shafts of the valve can easily be connected together and require only a single motor for their operation. For more precise setting the two valves are spring-biased.

In another embodiment, a third position of the valves is possible, in which only one valve is moved and thus the valves assume different positions. If, for example, only one valve is moved away from the long-and-narrow channel position, the length of the damping channel diminishes by a factor of 3; but the cross-sectional area remains the same. The resonance frequency therefore increases by a factor of $\sqrt{3}$ and, as in the example described above, assumes the value of 43.3 Hz, and thus this intermediate position can be used, for example, for the middle speed range of an internal combustion engine.

The mechanical realization is carried out in the embodiment last described by a coupling cam on a valve flap pivot shaft, so that over a certain angle of rotation of the directly driven valve, the other valve will not be moved with it.

The noise emissions differ considerably in these phases of operation in a preferred application of the invention, namely in the operation of an internal combustion engine with different numbers of cylinders. The frequency characteristic of the suction pulses is determined not only by the cylinder pulsed vibration but also by the harmonics; the frequency characteristic of the 6-cylinder engine can be described essentially by the interaction of the sine vibrations of the 6th and 12th harmonic, the amplitudes being definitely smaller than those of the cylinder pulsation. In contrast, the cycle of a 3-cylinder motor vibrates almost exclusively with the sine wave of the 3rd harmonic and the amplitude increases beyond the value of the single pulse; this can amount to a difference in level of the noise emission of 13 decibels.

According to the invention, during operation with cylinders cut out and with the flow path "long and narrow," the noise emission can be advantageously reduced. Especially the very loud humming sounds created by full-load operation, which in ordinary types of vehicles find a very easy path to the passenger compartment and could reach the ears of the passengers intensified by resonance, are successfully reduced.

From what has been said above, the result is that, for the reduction of noise, in addition to the size of the volume of the air intake apparatus, the dimensions of the so-called acoustic neck in the air intake tube are critical to the noise suppressing action. The narrower and longer the tube section is, the lower will be the frequency at which noise suppression begins. Especially also with the embodiment of the invention according to claims 6 to 12, a lengthening and narrowing of the air intake path can be achieved for better suppression of the lower frequency components. With a simple mechanical shifting of one of two inner tubes the aspirated air can be forced to turn around.

Additional advantageous embodiments of the invention are given in the dependent claims.

BRIEF DESCRIPTION OF THE DRAWINGS

Embodiments of the air flow device of the invention will be explained with reference to the drawing, wherein.

DETAILED DESCRIPTION OF PREFERRED EMBODIMENTS

Figure 1:
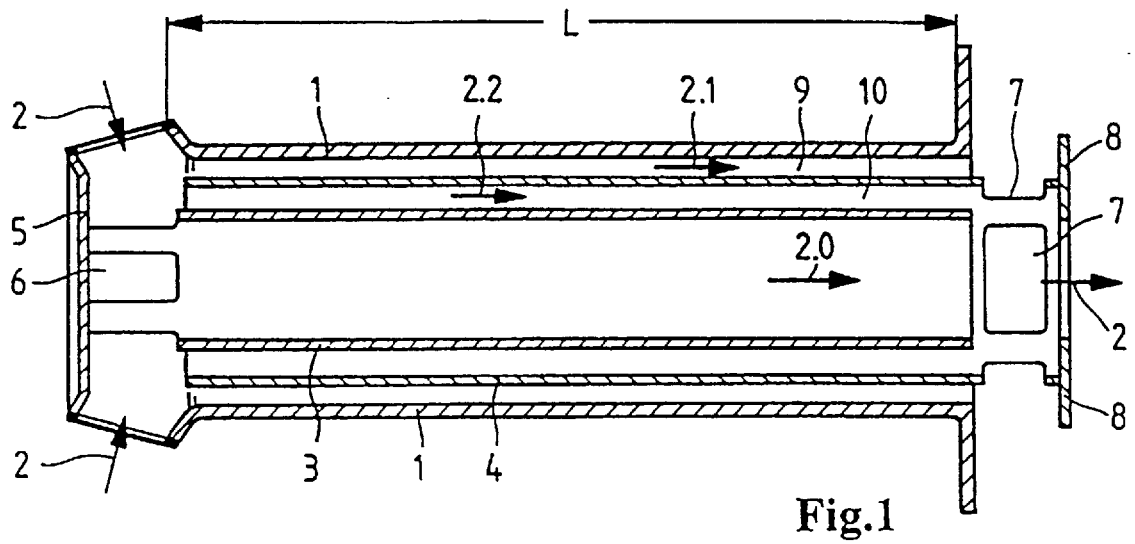
FIG. 1 shows a cross section through a first embodiment with a tube section of an air intake device with two inner tubes in the initial state.

In FIG. 1 there is shown a first embodiment with a tube 1 of an air intake device for an internal combustion engine here not shown, through which an air stream passes according to arrow 2 and arrows 2.0, 2.1 and 2.2, respectively. In tube section 1 a first inner tube 3 is affixed to it concentrically. An axially displaceable second inner tube 4 extends between this first inner tube 3 and the inner wall of tube 1. The second inner tube 4 can be displaced axially until it sealingly contacts a stop plate 5. The stop plate 5 here serves also as a mounting for the first inner tube 3.

The first inner tube 3 has at the bottom end adjacent the stop plate 5 a number of ports 6 through which the aspirated air can flow into the interior of the first inner tube 3 if the second inner tube 4 in FIG. 1 is not pushed down. At the upper end of the displaceable second inner tube 4 there are a number of ports 7 and a sealing plate 8 whose operation will be explained below with reference to FIG. 2. According to FIG. 1, the aspirated air flows parallel through the intermediate spaces 9 and 10 and through the inner tube 3 (arrows 2.0, 2.1 and 2.2).

In the embodiment just described, before a changeover from 6-cylinder to 3-cylinder operation, the movable inner tube 4 is in the position shown in FIG. 1, which permits a parallel flow through the three tube chambers. The length of the flow path is L, the flow cross section has the value 3·A, A being the area contained by the cross section of one of the three tube chambers.

Figure 2:
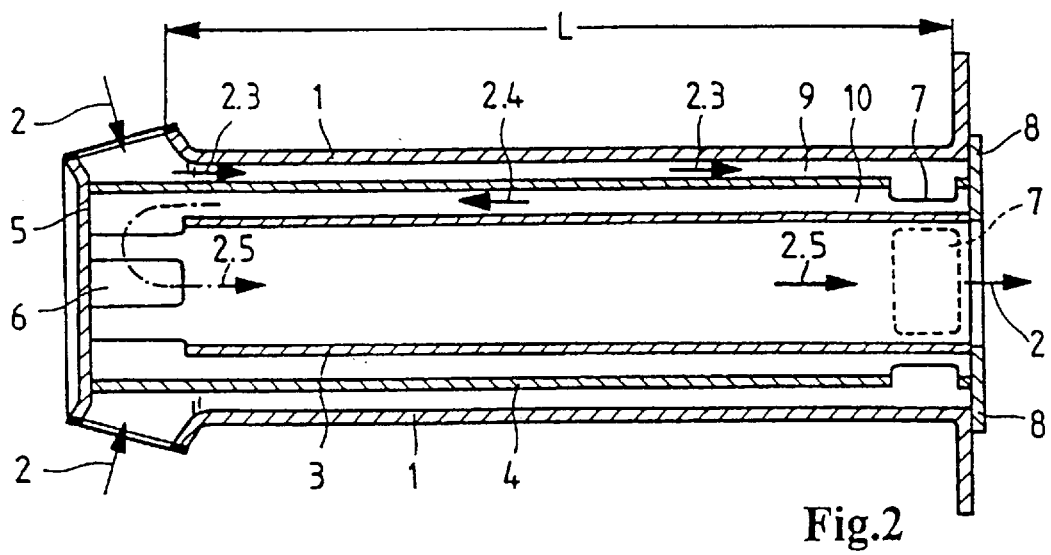
FIG. 2 shows a cross section through a tube section of an air intake device with two inner tubes in the switched state.

In FIG. 2, the second inner tube 4 is pushed down, so that it is in tight contact with the stop plate 5. The aspirated air is thus forced to flow through the first intermediate space 9 (arrow 2.3) and is directed at the right end by the sealing plate 8 to the ports 7 and flows back contrary to the air intake direction in the second intermediate space 10 (arrow 2.4). At the end of the intermediate space 10 the air passes through the ports 6 into the first inner tube and flows according to arrow 2.5. According to FIG. 2 a flow path is configured which, from the outside in, measures three times the length of tube section 1.

After the change from 6-cylinder to 3-cylinder operation the movable second inner tube 4 has assumed the left abutting position according to FIG. 2. The flow path is now 3·L, the flow cross section is A. The one-third reduction in flow cross section and the tripling of the flow path length can be considered as neutral with regard to the resistance to flow, since with the changeover to the flow path of FIG. 2 a state of operation of the engine is simultaneously created which, due to the low power demand, produces a corresponding low air flow volume.

The noise suppression of the air intake device according to the embodiment described above will now be explained with reference to FIGS. 3 to 5.

Figure 3:
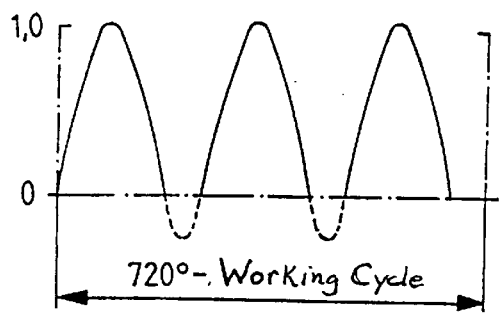
FIGS. 3 and 4 show the vibrations of a 3-cylinder and a 6-cylinder engine.
Figure 4:
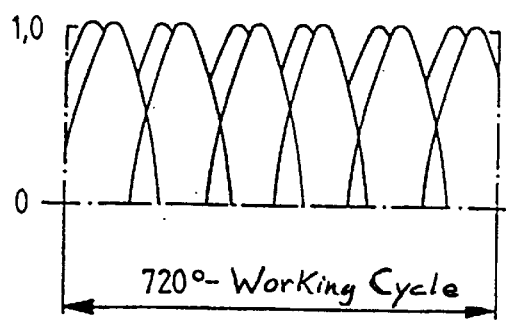

The timing of the suction pulses in 3-cylinder operation is shown in FIG. 3, and in 6-cylinder operation in FIG. 4. The cycle of the 6-cylinder motor of FIG. 4 shows the interaction of the sine vibrations of the 6th and 12th harmonics of a 720° working cycle, wherein it can be seen that the amplitudes of the resultant vibration are definitely less than those of the individual pulses. In contrast, the 3-cylinder cycle according to FIG. 3 vibrates almost exclusively with the sine vibration of the third harmonic and the amplitude at the same time increases beyond the value of the individual pulse. In the case of a motor speed of 3000 rpm, for example, in 6-cylinder operation there is an undesired frequency of 150 Hz and in 3-cylinder operation it is 75 Hz.

In the change from 6-cylinder operation to 3-cylinder operation an amplitude ratio of 1:4.5 is produced, which in the case of noise amounts to a difference in level of 13 dB.

Figure 5:
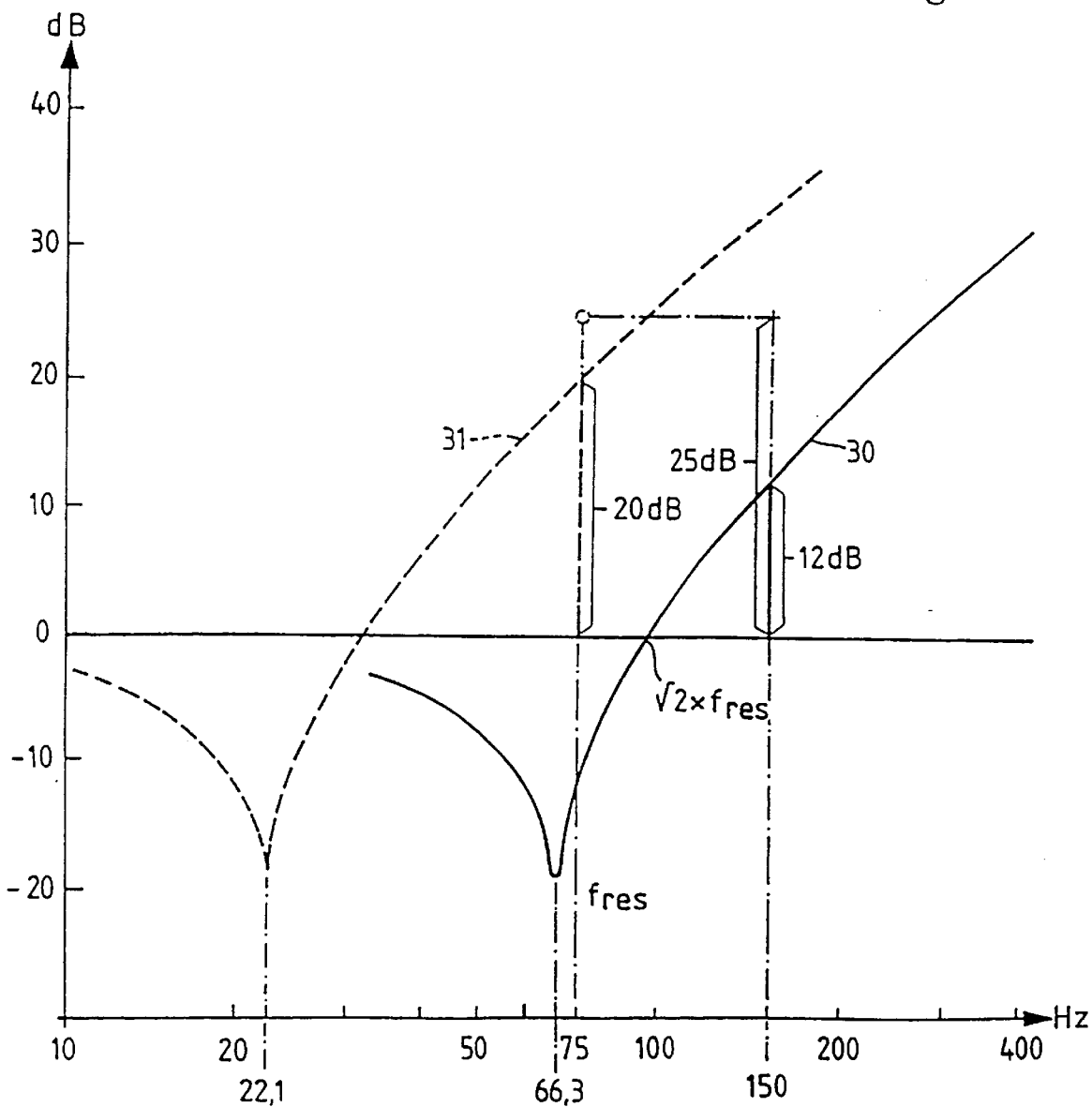
FIG. 5 shows a curve of the noise damping effect of an acoustic neck verses the frequency with different numbers of cylinders.

In FIG. 5 are seen curves of noise suppression versus frequency in the two states of operation. In curve 30 the suppression curve for 6-cylinder operation is shown, and in curve 31 the suppression curve for 3-cylinder operation.

In the case of optimization of the noise damping action it is to be noted that, in addition to the size of the volume, the dimensions of the acoustic neck are crucial to the damping action. The longer and narrower a tube is, the lower is the frequency at which damping begins. It must be the aim of the acoustical effort to get the resonance frequency $f_{res}$ lower than the excitation frequency, because the desired damping does not begin until the value is $\sqrt{2} \cdot f_{res}$.

The consequence is that, in the change from 6-cylinder operation to 3-cylinder operation the resonance frequency of the noise damping tube 1 must be lower by a factor of 3.77 if no increase in the sound level is to be accepted. This in turn necessitates changes in the dimensions of the noise damping neck and of the length and the cross-sectional area with a total action factor of 14.22. As FIG. 5 shows, if in this assumed interpretation of the 6-cylinder operation the resonance frequency is 66 Hz, the damping would then amount to 12 dB at 150 Hz (curve 20). After the change to 3-cylinder operation the excitation frequency would be 75 Hz, and as a result of the excitation which is 13 dB stronger, the damping would have to amount to 25 dB.

With the air intake device according to the embodiment it is brought about that the acoustically evaluated level is maintained, since the 75 Hz sound is evaluated as being 9.5 dB (A) weaker than the 150 Hz sound. Tuning to the resonance frequency of 22 Hz is sufficient, which is a frequency reduced by a factor of 3. The 75 Hz sound then occurring is damped by 20 dB (curve 21). The embodiment of the invention according to FIGS. 1 and 2 thus permits a tripling of the length of the damping neck and a one-third reduction of the area cross section and thus achieves the desired success.

Figure 6:
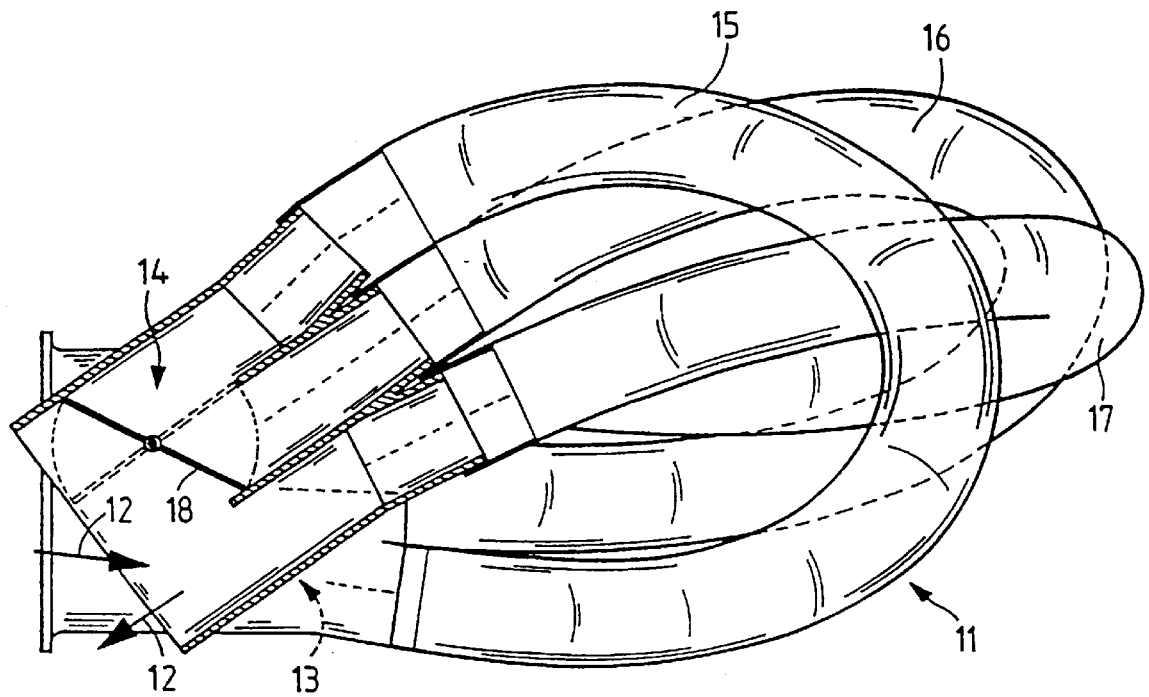
FIG. 6 shows an additional preferred embodiment showing the principle of the air flow device with three switchable flow channels.

FIG. 6 represents an additional preferred embodiment 11 of the air flow device of the invention, through which the air flows according to arrows 12. Between two adjusting device 13 and 14, channels 15, 16 and 17 are arranged, wherein the direction of flow in the channels 15, 16 and 17 is variable by valves 18 and 19 (not shown here). The ducts 15, 16 and 17 consist preferably of flexible material, so that this air flow device 11 can be contained even at locations on a unit (for example in the motor compartment of a motor car) at which not much space is available.

Figure 7:
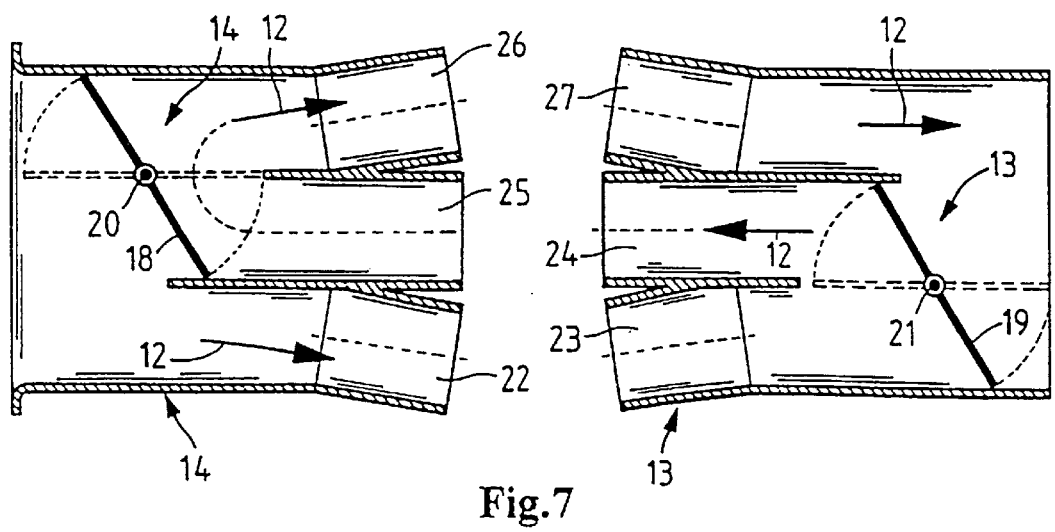
FIG. 7 shows in detail the adjusting devices of FIG. 6 with movable valve flaps in the flow channels.

In FIG. 7 the control devices 13 and 14 with the valve flaps 18 and 19 are shown in detail. The valve flaps 18 and 19 are rotatable about flap pivot shafts 20 and 21, these flap pivot shafts 20 and 21 being able also to be coupled together as can be seen in principle from FIG. 6.

If the valve flap 18 in the control device 14 is in the position shown in FIG. 6, the air stream is guided according to the arrows 12 through a lower port 22 into the channel 15 (cf. FIG. 6) and then into a port 23 of the control device 13. Due to the position of the valve 19 in the control device 13 the air is guided on through a port 24 into the channel 16 and thus arrives at a port 25 in the control device 14. Here too the air is guided back by the setting of the valve 18 through a port 26 into the channel 17 and through a port 27 reaches the control device 13, from which it can flow out.

In the flow path described above, what is involved is thus a series connection of the channels 15, 16 and 17 resulting in a long, narrow flow path producing a suppression of noise.

In the other setting of the valves 18 and 19, in which both are open as indicated in broken lines, all ports of the control devices 13 and 14 are free, so that the air can flow parallel through all channels 15, 16 and 17. The result is thus a shorter, wider flow path through the channels 15, 16 and 17.

The pivot shafts 20 and 21 of the valves 18 and 19 are mechanically coupled together in this embodiment, so that as a rule both valves are operated parallel to one another and, when driven by a servo motor, assume the same position in the particular control device 13 or 14. By means of coupling cams, not shown, on one of the respectively directly or indirectly operated valve pivot shafts 20 or 21, the indirectly driven valve 18 or 19 can remain in the starting position throughout a certain angular range, so that an additional setting is thus achieved.

In this last-named setting air flows through only one of the channels 15, 16 or 17, so that from the first-described setting a shortening of the length of the flow path by a factor of 3 is achieved with the same cross section. Upon a further turning of the driven pivot shaft the action of the coupling cam then brings about the setting for a parallel flow.

What is claimed is:

1. An air intake device defining an air intake flow path for a stream of air; said flow path having a length and a cross sectional area; wherein said intake device is divided into a plurality of parallel individual air flow channels; said intake device further comprising at least one adjusting element movable between a first position and a second position, said at least one adjusting element selectively blocking or admitting said stream of air to the individual air flow channels to effectively vary the cross sectional area of the air intake flow path; wherein said at least one adjusting element in said first position permits air to pass through said plurality of air flow channels simultaneously in the same direction and in said second position directs the air to pass successively in alternating directions through said plurality of flow channels.

2. An air intake device according to claim 1, wherein said at least one adjusting element effectively varies the cross sectional area and the length of the air intake flow path.

3. An air intake device according to claim 1, wherein said intake device has an inlet port and an outlet port and is divided into at least three parallel air flow channels each of which communicates at one end with the inlet port and at a second end with the outlet port, and said adjusting elements comprise valve flaps which in said first position direct the air stream from said inlet port in the same flow direction simultaneously through said parallel air flow channels to said outlet port, and in said second position direct the air stream from said inlet port in alternating flow directions successively through said parallel air flow channels to said outlet port.

4. An air intake device according to claim 3, wherein said inlet device is divided into three air flow channels and said valve flaps are pivotally journaled on respective pivot shafts and in said first position admit air from said inlet port directly to all three air flow channels so that air can flow through all of the channels in parallel fashion, and in said second position admit air from said inlet port to only one of the channels, direct air from said one channel to a second channel and from said second channel to the third channel, and only allow air to flow to said to said outlet port from said third channel.

5. An air intake device according to claim 4, wherein said adjusting elements are two valve flaps each pivotally journaled on a respective pivot shaft, and said pivot shafts are connected together and driven in common by a single motor.

6. An air intake device according to claim 4, wherein said adjusting elements are two valve flaps each pivotally journaled on a respective pivot shaft, wherein one of said pivot shafts is directly driven by an adjusting motor, and the other of said pivot shafts is connected to said one pivot shaft to rotate therewith and is indirectly driven by said adjusting motor through said one pivot shaft.

7. An air intake device according to claim 6, wherein said pivot shafts are connected to each other by a coupling cam which allows said one shaft to rotate through a given angular range before the other of said pivot shafts is caused to rotate therewith, whereby one of the two valve flaps can be closed without closing the other valve flap.

8. An air intake device according to claim 1, wherein said device is part of an air intake duct for an internal combustion engine of a motor vehicle.

9. An air intake device according to claim 8, wherein said internal combustion engine is a multi-cylinder engine in which the number of active cylinders can be selectively changed by an operator, and the length and cross sectional area of said air intake flow path are varied in response to the number of active cylinders selected by the operator.

10. An air intake device defining a flow path for aspirated air and comprising an outer tube section, a first inner tube disposed within said outer tube, and a second inner tube disposed within said first inner tube, whereby a first flow channel is defined between said outer tube and said first inner tube, a second flow channel is defined between said first inner tube and said second inner tube, and a third flow channel is defined inside said second inner tube, and means for selectively directing air flowing through said device to pass simultaneously through said first, second and third flow channels in the same direction or to pass sucessively in alternating directions through said first, second and third flow channels.

11. An air intake device according to claim 10, wherein said device is part of an air intake duct for an internal combustion engine.

12. An air intake device according to claim 10, wherein said intake device has an upstream end and a downstream end, said second inner tube having at least one radial port at the upstream end for admitting air into said second inner tube and being fixedly mounted within said outer tube, and said first inner tube is having at least one radial port adjacent said downstream end for admitting air into said second inner tube and being axially displaceable between a first position in which air can freely enter the upstream end and flow out from the downstream end of said outer tube and first and second inner tubes, and a second position in which air is blocked from entering the upstream end of said first inner tube and directed from the downstream end of the outer tube through the at least one radial port at the downstream end of the first inner tube and in reverse direction through the first inner tube to the at least one radial port at the upstream end of the second inner tube and thence through the second inner tube and exits the downstream end of the second inner tube.

13. An air intake device according to claim 12, wherein an annular sealing ring is attached to the downstream end of the first inner tube, said sealing ring closing off the downstream ends of said outer tube and said first inner tube with respect to the exterior of the intake device when said first inner tube is displaced to said second position.

14. An air intake device according to claim 12, wherein a stop plate is attached to the upstream ends of said outer tube and said second inner tube, said stop plate closing off the upstream end of the first inner tube with respect to the outer tube when said first inner tube is displaced to said second position.

15. An air intake device according to claim 12, wherein said first inner tube is displaceable on supporting elements mounted exteriorly on said second inner tube.

16. An air intake device according to claim 12, wherein said first inner tube is displaceable on supporting elements mounted interiorly on said outer tube.

17. An air intake device according to claim 12, wherein said intake device is part of the air intake duct of a multi-cylinder internal combustion engine in which the number of active cylinders can be selectively changed by an operator, and said first inner tube is displaced between said first and second positions in response to the number of active cylinders selected by the operator.

18. An air intake device according to claim 10, wherein said intake device is part of the air intake duct of a multi-cylinder internal combustion engine in which the number of active cylinders can be selectively changed by an operator, and said means for selectively directing air flowing through said device is actuated in response to the number of active cylinders selected by the operator.

19. An air intake device defining an air intake flow path for a stream of air; said flow path having a length and a cross-sectional area; wherein said intake device is divided into a plurality of air flow channels; said intake device further comprising at least one adjusting element movable between a first position and a second position to effectively vary the length and cross-sectional area of the air intake flow path; wherein said at least one adjusting element in said first position permits air to pass through said plurality of air flow channels simultaneously in the same direction and in said second position directs the air to pass successively in alternating directions through said plurality of flow channels.

20. An air intake device defining an air intake flow oath for a stream of air; said flow path having a length and a cross sectional area; wherein said intake device is divided into a plurality of parallel individual air flow channels; said intake device further comprising at least one adjusting element movable between a first position and a second position, said at least one adjusting element selectively blocking or admitting said stream of air to the individual air flow channels to effectively vary the cross sectional area of the air intake flow path, wherein said air flow channels are defined by an outer tube section, a first inner tube disposed within said outer tube, and a second inner tube disposed within said first inner tube so that a first flow channel is defined between said outer tube and said first inner tube, a second flow channel is defined between said first inner tube and said second inner tube, and a third flow channel is defined inside said second inner tube, and wherein said at least one adjusting element comprises means for selectively directing air flowing through said device to pass simultaneously through said first, second and third flow channels in the same direction or to pass successively in alternating directions through said first, second and third flow channels.

* * * * *